United States Patent

Lamb et al.

[11] 3,826,104
[45] July 30, 1974

[54] APPARATUS FOR CHARGING ABSORPTION REFRIGERATION SYSTEMS

[75] Inventors: Jimmy W. Lamb; Richard A. English, both of Indianapolis, Ind.

[73] Assignee: Carrier Corporation, Syracuse, N.Y.

[22] Filed: June 30, 1972

[21] Appl. No.: 267,744

[52] U.S. Cl. .................... 62/149, 62/292, 62/476
[51] Int. Cl. ............................................. F25b 45/00
[58] Field of Search ....... 62/77, 101, 149, 292, 476; 141/37, 198

[56] References Cited
UNITED STATES PATENTS
| | | | |
|---|---|---|---|
| 1,799,201 | 4/1931 | Von Platen | 62/77 |
| 1,830,894 | 11/1931 | Ullstrand | 62/77 |
| 3,302,421 | 2/1967 | Karnes | 62/292 X |
| 3,400,552 | 9/1968 | Johnson | 62/292 X |

Primary Examiner—William F. O'Dea
Assistant Examiner—Peter D. Ferguson
Attorney, Agent, or Firm—J. Raymond Curtin

[57] ABSTRACT

An apparatus for automatically adding and removing solution from an ammonia-water absorption refrigeration system to provide a proper charge in the machine which is especially adapted for use under field service conditions. The apparatus includes a solution tank and control means connected to the system for alternately withdrawing excess solution from the analyzer and adding refrigerant vapor at the evaporator or for withdrawing refrigerant vapor from the analyzer and adding solution at the evaporator while the refrigeration system is in operation, to automatically achieve an accurate solution charge in the machine.

6 Claims, 2 Drawing Figures

APPARATUS FOR CHARGING ABSORPTION REFRIGERATION SYSTEMS

BACKGROUND OF THE INVENTION

The optimum charge of refrigerant and water in an aqua-ammonia absorption refrigeration machine is critical. Under factory conditions, an accurately controlled initial charge can easily be supplied to the machine to provide the desired quantity of refrigerant and water.

However, after field repairs, difficulty is experienced in properly charging a machine because the quantity of solution in the system after it has been cut open cannot be accurately determined. An ammonia-water absorption machine contains numerous traps and locations where liquid may accumulate in an unknown quantity and it is usual for most of the solution to remain in these various locations after the serviceman has drained the machine to perform whatever servicing may be required in the field. Furthermore, due to its solubility characteristics, the charge of ammonia in the machine is materially affected by the temperature of the liquid which drained from the machine, which in turn may depend upon ambient temperature or other conditions at the time the servicing was performed.

However, a machine having an improper charge may exhibit reduced capacity and higher operating costs. Also, an undercharged machine may tend to cause the generator to run at an excessively high temperature which can result in failure, and an overcharged machine may cause solution to boil up into the rectifier at low ambient temperatures and seriously degrade the performance of the system. A greatly over or undercharged machine usually will not run at all.

Unfortunately, it is often difficult to distinguish an undercharged machine from an overcharged machine so that it is especially difficult for the serviceman to recognize when the machine is properly charged. For example, it is apparent that the level of solution in the generator of an undercharged machine will usually be low, but it is also a fact that the level in the generator of an overcharged machine may also be excessively low. The reason for this apparent anomaly is that if the level of solution in the generator is initially high, it will boil up into the rectifier where it is rapidly cooled. The cooled solution will reduce the vapor pressure in the generator and cause extremely rapid boiling which may then cause slugs of liquid and gas to be expelled from the generator and carried through the rectifier into the condenser. Consequently, the level of solution in the generator will be lower than normal until the solution blown into the condenser is returned to the generator, but the condition will reoccur as soon as the level builds up again in the generator. It is therefore difficult for the serviceman to know when the machine has been properly charged, and at best, the charging procedure is an expensive, time consuming operation which must be skillfully performed to assure that the proper solution charge is present.

A common method of obtaining a proper charge following a field repair is to add a quantity of solution while the machine is running, then run the machine for fifteen to thirty minutes for the system to stabilize, and then to open a valve at the proper level in the generator to see whether solution runs out. More solution is then added and the process repeated numerous times until the serviceman is satisfied that only the desired level is being stably maintained during normal operation of the system. Only a small quantity of solution is added each time to avoid instability due to overcharging. This technique requires many hours before a satisfactory charge is obtained and requires much coupling and uncoupling of connections and manipulation of valves, as well as skill on the part of the serviceman. Consequently, the charging procedure materially adds to the cost of field servicing and, if poorly done, may result in unsatisfactory operation of the refrigeration system.

Accordingly, it is a principal object of this invention to provide an apparatus whereby the correct charge of solution may be automatically and easily obtained in an absorption refrigeration machine in a relatively short period of time without special skill.

SUMMARY OF THE INVENTION

An apparatus in accordance with this invention may comprise a charging tank adapted to contain absorbent solution and refrigerant vapor. A first passage means is adapted to be connected with the high pressure side of the absorption refrigeration machine at the height at which it is desired to maintain a level of solution in the machine. A second passage means is adapted to be connected to the low pressure side of the refrigeration machine for the passage of refrigerant vapor thereto from the charging tank. A third passage means is adapted to be connected to the low pressure side of the refrigeration machine for the passage of absorbent solution thereto from the charging tank. Sensing means and control means are provided to open the second passage means and close the third passage means in response to the passage of absorbent solution through the first passage means and conversely, to close the second passage means and open the third passage means when solution no longer passes to the charging apparatus through the first passage.

The apparatus in accordance with this invention automatically withdraws solution and adds vapor to the machine or it withdraws vapor and adds solution to the machine while the refrigeration system is in operation, to automatically establish the proper solution charge in a relatively short period of time without the necessity of attention by the serviceman.

DESCRIPTION OF THE PREFERRED EMBODIMENT

Figure 1:
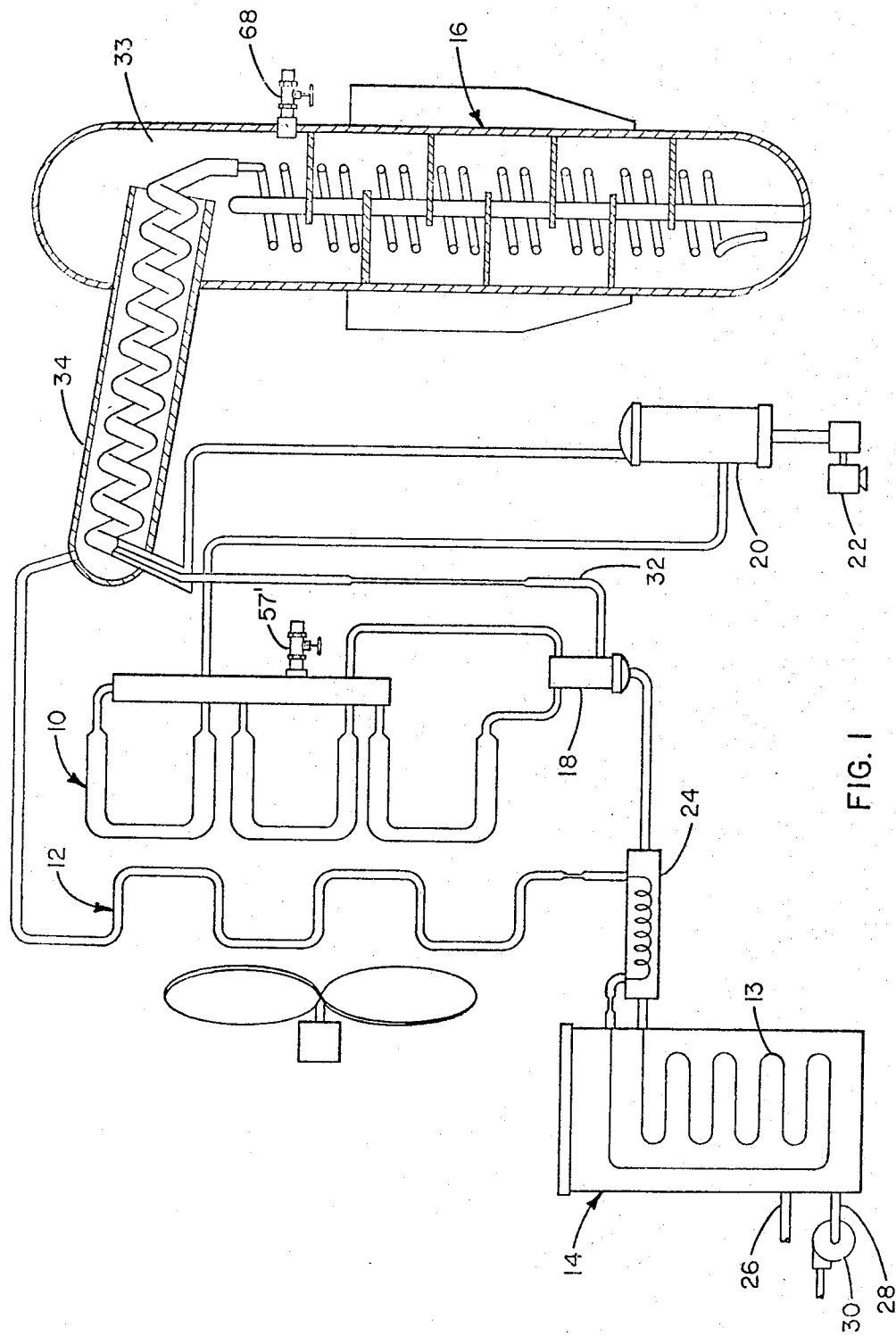
FIG. 1 is a schematic diagram of an absorption refrigeration machine.

Referring to FIG. 1 of the drawings, there is illustrated an absorption refrigeration system comprising an absorber 10, a condenser 12, an evaporator 13 in a chiller tank 14, a generator 16, and a vapor distributor 18 connected to provide refrigeration. A pump 20 actuated by a pump motor 22 is employed to circulate weak absorbent solution from absorber 10 to generator 16.

As used herein, the term "weak solution" refers to an absorbent solution which is weak in absorbing power and the term "strong solution" refers to absorbent solution which is strong in absorbing power. A suitable absorbent for use in the system described is water; a suitable refrigerant is ammonia.

Liquid refrigerant condensed in condenser 12 passes through a liquid-suction heat exchanger 24 into the evaporator 13 where it evaporates to produce cooling. A heat exchange medium such as water is circulated through chiller 14 in heat exchange relation with the evaporating refrigerant in evaporator 13 and is circulated by means of lines 26, 28 and pump 30 to suitable remote heat exchangers (not shown) to satisfy a cooling load. Refrigerant vapor from evaporator 13 is supplied to refrigerant distributor 18 where it is mixed with strong solution supplied from the generator thereto through line 32. The refrigerant vapor and strong solution circulate through the absorber 10 wherein the refrigerant vapor is absorbed in the strong solution for passage to pump 20. The weakened solution is then transferred to generator 16 by pump 20. The solution within the generator is heated by a suitable means such as a gas flame to vaporize or boil off the ammonia which is thereafter purified in analyzer 33 of generator 16 and in rectifier 34 prior to its passage to condenser 12. A more detailed description of the absorption refrigeration system may be had by reference to U.S. Pat. No. 3,603,104 granted Sept. 7, 1971, to Gerald K. Gable.

Figure 2:
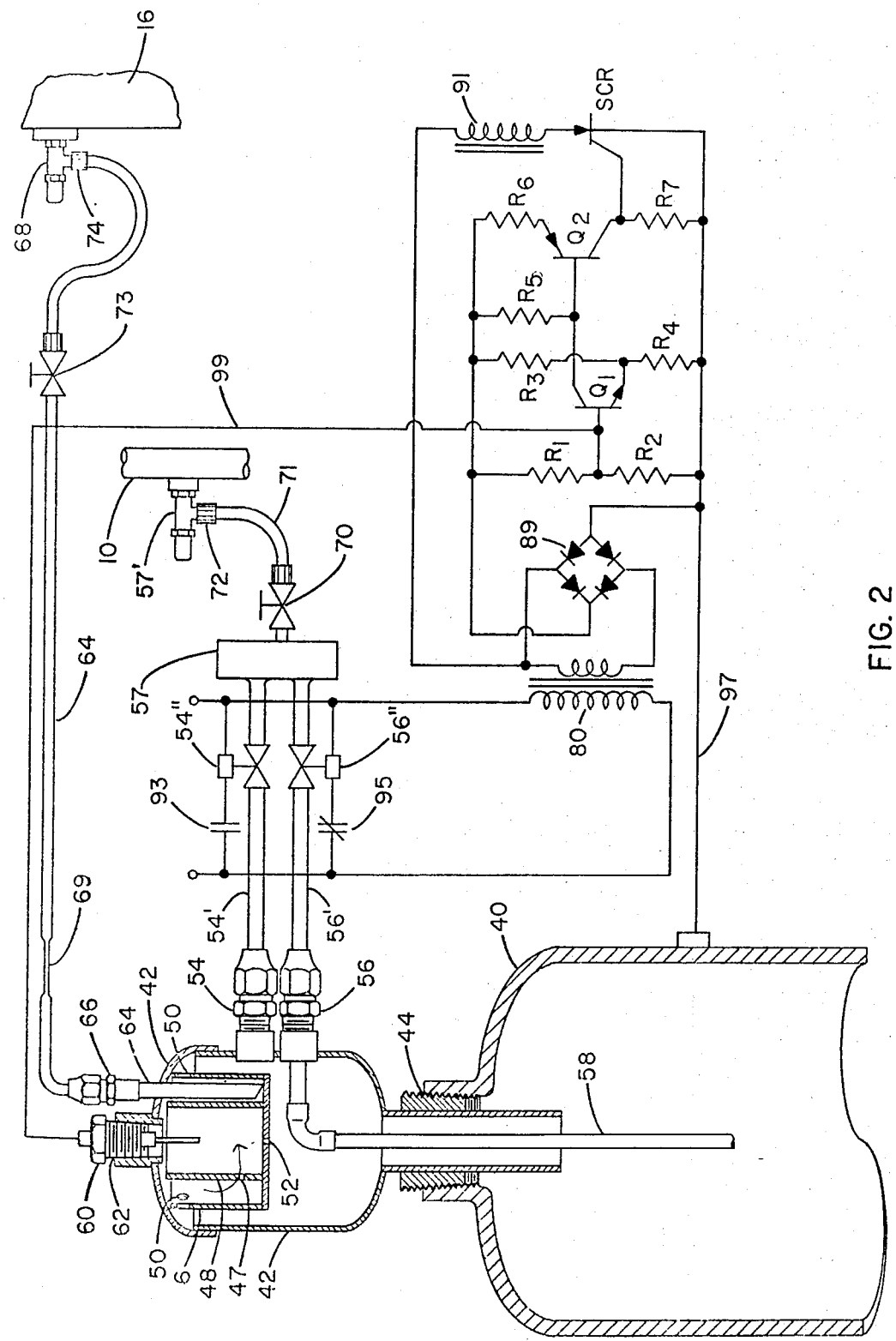
FIG. 2 shows a partial sectional view of a portion of the solution charging device and schematically illustrates an electronic control for use therewith.

Referring to FIG. 2, there is illustrated a charging apparatus for providing the proper level of solution within the absorption machine illustrated in FIG. 1. The charging apparatus comprises a solution tank 40 having a housing 42 suitably attached thereto as by threaded connection 44. Housing 42 is provided with a container means which includes concentric containers 46 and 48, suitably secured adjacent the top portion of housing 42 as by welding. Container 46 is provided with a plurality of upper openings 50 and container 48 is provided with a bottom opening 52. Communication between container 46 and container 48 is provided by a suitable lower opening 47 formed in the wall of container 48 and at its upper end which terminates below the top of housing 42. Fittings 54 and 56 which communicate with the interior of housing 42 are adapted for communication to the low pressure side of the absorption refrigeration machine by means of restricted or capillary passages 54' and 56' and solenoid valves 54'' and 56''. Solenoid valves 54'' and 56'' are preferably mounted on a suitable manifold 57. Manifold 57 is adapted for connection to manual valve fitting 57', on absorber 10 or other vapor location on the low pressure side of the absorption refrigeration system, through manual shutoff valve 70 and flexible passage 71 having a suitable fitting 72 thereon to connect with valve 57'. Fitting 56 is provided with a pickup pipe 58 which extends downwardly into solution tank 40 and terminates adjacent the bottom thereof, below the level of solution therein, for passage of solution from tank 40 through fitting 56. Fitting 54 extends into communication with the refrigerant vapor space in housing 42 and tank 40.

A level sensor probe 60 is suitably secured to the top portion of housing 42 as by threads 62, the probe portion of the sensor projecting downwardly into container 48 to a level below the openings 50 provided in the container 46. For a complete description of the construction of probe 60, reference may be had to U.S. Pat. No. 3,603,104.

A flexible solution inlet pipe 64, having restriction 69 therein, is connected by a fitting 66 to housing 42. Pipe 64 extends downwardly into container 46 and is adapted for connection to a suitable manual valve 68 provided on the side of analyzer 33 of generator 16, or other location on the high pressure side, at the height at which it is desired to maintain the solution level during operation of the machine. A shutoff valve 73 is disposed in flexible pipe 64 which is connected to valve 68 by a fitting 74. The space between containers 46 and 48 may be filled with a suitable packing such as steel wool (not illustrated) to prevent foaming of the solution supplied to container 46 from generator 16 through line 64.

Referring more particularly to the electronic circuit illustrated in FIG. 2, there is illustrated a suitable transformer 80 adapted to reduce the 115 volt line to 24 volts for operation of the electronic circuit. The electronic circuit comprises a diode bridge 89, resistors $R_1$, $R_2$, $R_3$, $R_4$, $R_5$, $R_6$ and $R_7$, transistors $Q_1$ and $Q_2$, silicon controlled rectifier SCR and a relay 91 having a set of normally open contacts 93 adapted for connection to solenoid valve 54'' and a set of normally closed contacts 95 adapted for connection to solenoid valve 56''.

The electronic circuit is grounded to the solution container by means of a line 97 and is connected to probe 60 by means of a line 99. When there is sufficient solution within container 48 to submerge the tip of probe 60, the solution functions as a capacitor connected between lines 97 and 99.

Diode bridge 89 provides full wave rectified supply voltage to the control. Resistors $R_1$, $R_2$, $R_3$ and $R_4$ form a resistance bridge and transistor $Q_1$ functions as an error voltage detector. When solution comes in contact with probe 60, a positive DC voltage is developed at the base of transistor $Q_1$ due to the capacitive effect of the solution. This is sufficient to forward bias transistor $Q_1$ and turn it on during each half cycle of supply voltage.

When $Q_1$ turns on, the resulting voltage drop across resistor $R_5$ forward biases transistor $Q_2$ causing it to conduct current through resistors $R_6$ and $R_7$, which in turn causes SCR to turn on. The SCR will remain "latched on" until the end of the half cycle. Thus, the SCR will turn on for a portion of the cycle and conduct current through the relay 91 as long as solution is in contact with the probe.

Stated another way, when there is no solution at the probe, the voltages at the base and emitter of transistor $Q_1$ are essentially equal, thus $Q_1$ is off and the relay will not be energized. When solution is present at the probe, a voltage is created at the base of $Q_1$ due to the capacitance effect of the solution. This DC voltage is sufficient to turn on $Q_1$, which in turn causes $Q_2$ and SCR to turn on and energize relay 91.

In operation, flexible pipe 64 is connected by fitting 74 to valve fitting 68 on generator 16 of the absorption machine. Manifold 57 is connected to the low pressure side of the absorption system, for example, to a valve fitting 57' on a portion of absorber 10 by fitting 72. The electronic circuit is plugged into a source of 115 volt current and the absorption machine started. After the machine has been run for a sufficient period of time for the operation to stabilize, valves 68 and 57' and valves 70 and 73 are opened to connect the charging apparatus to the system. If there is an excess of solution within the generator, the solution will flow from valve 68, through restricted passage 64, into container 46 and through opening 47 into container 48. Due to the restricted drain of container 48 through opening 52, the solution level within containers 46 and 48 will rise and submerge probe 60. When probe 60 is submerged as explained heretofore, relay 91 will be energized thereby closing contacts 93 and opening contacts 95.

With contacts 93 closed and contacts 95 opened, solenoid valve 54" will open and solenoid valve 56" will close. By opening solenoid valve 54", the manifold 57 and therefore the low pressure side of the absorption machine will be in connection with the vapor space within housing 42 adjacent fitting 54, allowing refrigerant vapor to be drawn into the machine as the excess solution flows from the generator through passage 64 into container 46. Passage 54' insures that the charging vessel 40 remains at a pressure intermediate between the high and low sides of the system so solution can flow in from high side and out to the low side.

When the level of solution within the generator drops below the level of valve 68, vapor will flow from valve 68 through line 64 into container 46. Since solution is no longer supplied to container 46, 48, container 48 will drain through restricted opening 52 so that probe 60 is no longer submerged. In the absence of solution at probe 60, the control circuit will no longer conduct current and relay 91 will thereby be deenergized causing contacts 95 to close and contacts 93 to open. This will cause valve 54" to close and valve 56" to open. Under these circumstances, manifold 57 will be in communication through valve 56", line 56', fitting 56 and pickup tube 58 which is submerged in solution within tank 40, thereby supplying solution from tank 40 through manifold 57 and valve 57' to the low pressure side of the absorption system to add solution thereto. When the solution level within the generator again rises above the level of valve 68, solution will be supplied to containers 46 and 48 thereby submerging the probe in solution, energizing the electronic circuit and the relay 91 to close solenoid valve 56" and open solenoid valve 54".

The absorption machine and the charging system connected thereto is allowed to operate in this manner for a period of time until the cycled opening and closing of valve 56" and 54" is fairly rapid indicating the desired solution level has been obtained within the machine at which time valves 68, 73, 57', 70 are closed and the charging apparatus disconnected from the system.

It can be seen that by using the disclosed charging apparatus, the serviceman does not have to determine whether the system is undercharged or overcharged since the device will automatically add and remove solution from the machine as required.

While we have described a preferred embodiment of our invention, it should be understood that the invention is not limited thereto, but may be otherwise embodied within the scope of the following claims.

We claim:

1. An apparatus for charging an absorption refrigeration system comprising:

A. a charging tank adapted to contain absorbent solution and refrigerant vapor;
   B. first passage means adapted for connecting said charging tank to the high pressure side of an absorption refrigeration machine at a height at which it is desired to maintain a level of solution therein;
   C. second passage means adapted for connecting a location in said charging tank containing refrigerant vapor with the low pressure side of the refrigeration machine for supplying refrigerant vapor to the machine;
   D. third passage means adapted for connecting a location in said charging tank containing absorbent solution to the low pressure side of the absorption refrigeration machine for supplying absorbent solution to the machine;
   E. valve means associated with said second and third passage means for controlling the passage of fluid therethrough;
   F. sensing means responsive to the passage of liquid to the charging tank through said first passage means; and
   G. control means for automatically controlling said valve means in response to said sensing means, said control means opening said second passage means in response to the passage of liquid to the charging tank through said first passage means, and said control means closing said second passage and opening said first passage in response to the absence of the passage of liquid to the charging tank through said first passage means, whereby said apparatus is enabled to automatically establish a charge of solution in the absorption refrigeration machine when connected to the machine during operation thereof, by alternately withdrawing absorbent solution while adding refrigerant vapor and withdrawing refrigerant vapor while adding absorbent solution.

2. An apparatus for charging an absorption refrigeration machine as defined in claim 1 wherein said sensing means comprises a container disposed to receive absorbent solution passing from the refrigeration machine through said first passage means, said container having restricted drain means associated therewith for draining absorbent solution therefrom into said charging tank, and means for sensing the presence of a predetermined level of solution in said container due to the discharge of solution into the container at a faster rate than it is drained therefrom.

3. An apparatus for charging an absorption refrigeration machine as defined in claim 2 wherein said sensing means further includes a probe for electrically sensing the presence of the predetermined solution level in said container.

4. An apparatus for charging an absorption refrigeration machine as defined in claim 1 wherein said second passage means and said third passage means include common manifold, said manifold being adapted to be connected with the low pressure side of said machine whereby only a single connection need be made to connect both said second and third passages with the low pressure side of the machine.

5. An apparatus for charging an absorption refrigeration system as defined in claim 1 wherein said sensing means and said first, second and third passage means are connected to a housing which is detachably secured to said charging tank.

6. An apparatus for charging an absorption refrigeration machine comprising:

A. a housing adapted to be detachably secured to and in communication with the vapor space in a charging tank containing absorbent solution and refrigerant vapor, said housing having a container disposed therein, said container having a drain orifice for draining the contents of said container into said housing for passage into the charging tank, said housing further having a tube extending therethrough adapted to extend into the charging tank below the level of absorbent solution in the tank;

B. first restricted passage means adapted for connecting said container directly to a location on the high pressure side of an absorption refrigeration machine at a height thereon at which it is desired to maintain a level of solution therein;

C. second restricted passage means adapted for connecting the interior of said housing with the low pressure side of the absorption refrigeration machine for supplying refrigerant vapor to the machine;

D. third restricted passage means adapted for connecting the solution tube in said housing to the low pressure side of the absorption refrigeration machine for supplying solution to the machine;

E. valve means disposed in said second and third passage means for controlling the flow of fluid through the passages;

F. a sensing probe extending into said container for detecting the presence of a predetermined level of solution therein; and G. control means for automatically controlling said valve means in response to the condition sensed by said sensing means, said control means opening said second passage means and closing said third passage means in response to a level of solution in said container above said predetermined level, and said control means closing said second passage means and opening said third passage means in response to a liquid level in said container above said predetermined level, whereby said apparatus is enabled to automatically establish a charge of solution in the absorption refrigeration machine when connected to the machine during operation thereof, by alternately withdrawing absorbent solution while adding refrigerant vapor and withdrawing refrigerant vapor while adding absorbent solution.

* * * * *